(12) United States Patent
Lafferty et al.

(10) Patent No.: US 9,020,930 B2
(45) Date of Patent: Apr. 28, 2015

(54) PROJECT MANAGEMENT SYSTEM WITH GEOGRAPHIC DATA

(75) Inventors: Shawn P. Lafferty, Springfield, PA (US); Alex Zeltov, Warrington, PA (US)

(73) Assignee: Oracle International Corporation, Redwood Shores, CA (US)

( * ) Notice: Subject to any disclaimer, the term of this patent is extended or adjusted under 35 U.S.C. 154(b) by 205 days.

(21) Appl. No.: 13/560,296

(22) Filed: Jul. 27, 2012

(65) Prior Publication Data

US 2014/0032530 A1 Jan. 30, 2014

(51) Int. Cl.
G06F 17/30 (2006.01)

(52) U.S. Cl.
CPC ................................ *G06F 17/30241* (2013.01)

(58) Field of Classification Search
CPC .................................................. G06F 17/30242
See application file for complete search history.

(56) References Cited

U.S. PATENT DOCUMENTS

| | | | |
|---|---|---|---|
| 6,202,023 B1 * | 3/2001 | Hancock et al. | 701/516 |
| 6,324,647 B1 * | 11/2001 | Bowman-Amuah | 726/23 |
| 6,882,441 B1 * | 4/2005 | Faust et al. | 358/1.18 |
| 7,107,285 B2 * | 9/2006 | von Kaenel et al. | 1/1 |

OTHER PUBLICATIONS

Jones, Trial by Tornado: One records facility's response to a devastating tornado demonstrates the necessity of a solid disaster recovery plan Mar. 2000, Infopro, vol. 2 No. 1, http://cool.conservation-us.org/byauth/jonesw/tornado.html.*
Dell Latitude D400 Copyright 2004, Dell Inc., 2 pages.*

* cited by examiner

*Primary Examiner* — Jason Liao
(74) *Attorney, Agent, or Firm* — Miles & Stockbridge PC

(57) ABSTRACT

A system for retrieving project management data based upon geographic criteria defines a plurality of locations. The system assigns the plurality of locations to project management data stored within a memory, wherein the project management data comprises a plurality of projects, a plurality of activities, and a plurality of resources, and the locations are assigned to the plurality of projects, activities, and resources. The system receives a request to retrieve project management data with assigned locations that meet a geographic criteria. The system retrieves project management data that meets the geographic criteria.

20 Claims, 16 Drawing Sheets

```
                                                                801
LOCATION                                                       /
Columns                                                       /
Key   Name Type       Description     Default               /
PK    location_id     integer Unique ID
      location_name   string(255)    Name for this location                                         802
      location_type   string(24)     Type of location - LT_Place,LT_Line,LT_Territory
      address_line1   string(200)    Address line with street and street number
      address_line2   string(200)    Address line 2 with street and street number
      address_line3   string(200)    Address line 3 with street and street number
      city_name       string(200)    City Name maps to GEO_ADDR:SETTLEMENT
      municipality_name   string(200)    Municipality Name (European Only) GEO_ADDR:MUNICIPALITY
      state_name      string(200)    State/Province/Prefecture Name GEO_ADDR:REGION
      state_code      string(2)      State code                                                    803
      country_name    string(200)    Country Name
      country_code    string(3)      Three character ISO Country code GEO_ADDR:COUNTRY          804
      postal_code     string(20)     Postal Code
      longitude       numberLongitude - Primary for SQL Server database
      latitude numberLatitude - Primary for SQL Server database                                   805
      geo_location    geometry       SDO_GEOMETRY field
      update_date     date    Refresh audit field of last date updated. Trigger maintained.
      update_user     string(255)    Refresh audit field of last user updated. Trigger maintained.
      create_date     date    Refresh audit field for date record created. Trigger maintained.
      create_user     string(255)    Refresh audit field for user that created the record. Trigger maintained.
      delete_session_id    integer Deleted by session id. Client maintained.
      delete_date     date    Deleted date. Client maintained.
```

Fig. 2

| Resource Management | | | |
|---|---|---|---|
| Resources | Resource Teams | Roles | Role Teams |
| ID | Name | Location | Primary Role |
| North America | | | |
| AndersonG | Glen Anderson, VP Development | San Francisco | |
| BillingsJ | Judy Billings | Miami Gardens | Process Architect |
| Cretefinisher | Concrete Finisher | Corona | Trades |
| Elec | Electrician | San Francisco | Trades |
| Elev Inst | Elevator Installer | New York | |
| Fabrication | Fabrication | Los Angeles | Trades |
| Floor | Floor and Carpet Layer | Chicago | Trades |
| FrostB | Ben Frost | Boston | Business Process Analyst |
| INSP | Inspections | Oklahoma City | |
| LincolnR | Robert Lincoln | Baytown | Engineer |
| McneillL | Lori McNeil | Cincinnati | Project Leader |

LOCATION
Columns
| Key | Name | Type | Description | Default |
|---|---|---|---|---|
| PK | location_id | integer | Unique ID | |
| | location_name | string(255) | Name for this location | |
| | location_type | string(24) | Type of location - LT_Place,LT_Line,LT_Territory | |
| | address_line1 | string(200) | Address line with street and street number | |
| | address_line2 | string(200) | Address line 2 with street and street number | |
| | address_line3 | string(200) | Address line 3 with street and street number | |
| | city_name | string(200) | City Name maps to GEO_ADDR:SETTLEMENT | |
| | municipality_name | string(200) | Municipality Name (European Only) GEO_ADDR:MUNICIPALITY | |
| | state_name | string(200) | State/Province/Prefecture Name GEO_ADDR:REGION | |
| | state_code | string(2) | State code | |
| | country_name | string(200) | Country Name | |
| | country_code | string(3) | Three character ISO Country code GEO_ADDR:COUNTRY | |
| | postal_code | string(20) | Postal Code | |
| | longitude | number | Longitude - Primary for SQL Server database | |
| | latitude | number | Latitude - Primary for SQL Server database | |
| | geo_location | geometry | SDO_GEOMETRY field | |
| | update_date | date | Refresh audit field of last date updated. Trigger maintained. | |
| | update_user | string(255) | Refresh audit field of last user updated. Trigger maintained. | |
| | create_date | date | Refresh audit field for date record created. Trigger maintained. | |
| | create_user | string(255) | Refresh audit field for user that created the record. Trigger maintained. | |
| | delete_session_id | integer | Deleted by session id. Client maintained. | |
| | delete_date | date | Deleted date. Client maintained. | |

PROJECT MANAGEMENT SYSTEM WITH GEOGRAPHIC DATA

FIELD

One embodiment is directed generally to a computer system, and in particular to a computer system that joins project management data with geographic data.

BACKGROUND INFORMATION

A project is an enterprise that may involve a set of tasks that are planned to achieve a particular result. Project management is the discipline of planning, organizing, and coordinating resources to achieve specific goals to bring about the particular result. A project may include a starting date and a completion date that depend upon the complexity and time requirements of the tasks to be completed. Each project task may also have deadlines that are determined and modified based upon the progress of other project tasks. A project may be determined to be finished when the associated tasks are finished.

Project management systems are computer systems that aid users in initiating, planning, executing, and monitoring various aspects of a large project. For example, a project management system may be used to schedule the events of a project. A project management system may help the user to overcome some common challenges in scheduling such as: (1) scheduling events that depend upon the outcome of other circumstances, (2) scheduling events that have an inexact duration, and (3) scheduling events in conjunction with the scheduling of necessary resources.

A project management system may also be used to provide relevant information to stakeholders of a large project. Such information may include: (1) estimates on the time required to finish various tasks of the project, (2) warnings about possible circumstances adverse to the completion of the project, (3) description of the workload at various stages of the project, (4) ways to optimize the resources of the project, and (5) the costs associated with the project.

SUMMARY

One embodiment is a project management system for retrieving project management data based upon geographic criteria. The system defines a plurality of locations. The system assigns the plurality of locations to project management data stored within a memory, wherein the project management data comprises a plurality of projects, a plurality of activities, and a plurality of resources, and the locations are assigned to the plurality of projects, activities, and resources. The system receives a request to retrieve project management data with assigned locations that meet a geographic criteria. The system retrieves project management data that meet the geographic criteria.

BRIEF DESCRIPTION OF THE DRAWINGS

FIG. 2 is a screen shot of a user defining a location in accordance with one embodiment.

FIG. 3 is a screen shot of a list of resources in accordance with one embodiment.

FIG. 4 is a screen shot of a user assigning a location to a project in accordance with one embodiment.

FIG. 8 illustrates tables for storing geographic data according to one embodiment.

DETAILED DESCRIPTION

One embodiment is a project management system that combines project management data and geographic data in a single source. The system may allow users to run complex, location-based searches/queries on project management data and thus efficiently plan, coordinate, and adjust to changing work processes. The system may allow users to efficiently manage operations on a project-level, activity-level, and resource-level. The system may also allow users to track resources geographically and coordinate deployment of the resources.

Project management data and spatial data have previously resided in multiple, separate sources. The project management data and the spatial data could only be combined using third-party tools. Performing a geographic-based search across these multiple, separate sources was difficult, if not impossible. One difference between an embodiment of the present project management system when compared to the known project management systems is that the user is able to perform geographic-based search across projects, activities, and resources, in a system using integrated data.

Figure 1:
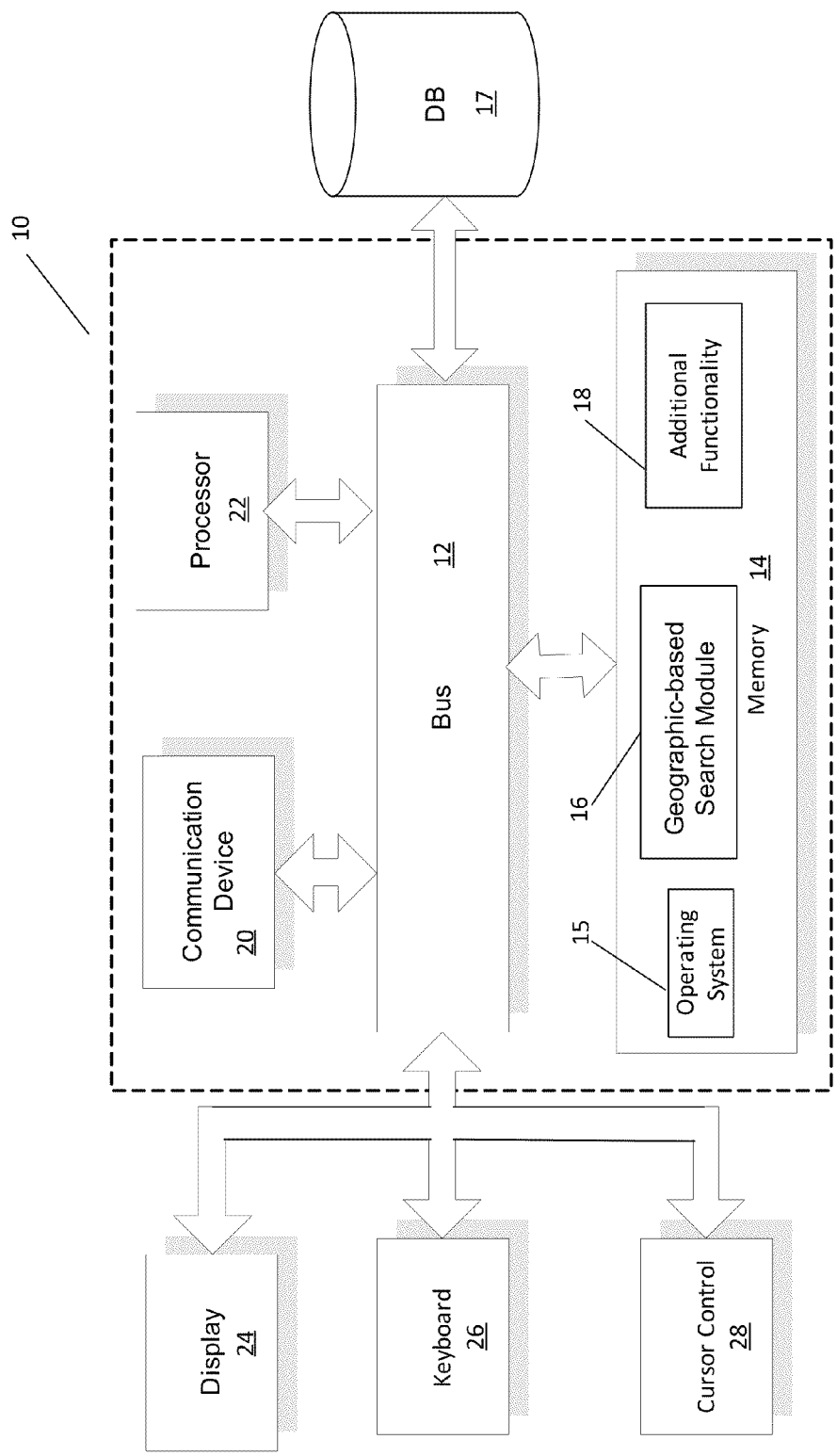
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules include an operating system 15 that provides operating system functionality for system 10. The modules further include geographic-based search module 16 for a project management system that allows a user to define locations and to search for project management data based upon geographic criteria, as disclosed in more detail below. System 10 can be part of a larger system such as a project management system (e.g., "Primavera" from Oracle Corp.) or an enterprise resource planning ("ERP") system (e.g., "E-Business Suite" from Oracle Corp.) Therefore, system 10 will typically include one or more additional functional modules 18 to include the additional functionality. A database 17 is coupled to bus 12 to store data used with modules 16 and 18. Specifically, database 17 may store project management data along with geographic/spatial data in a single entity.

FIG. 2 is a screen shot of a user defining a location in accordance with one embodiment. The screen shot of FIG. 2, and the screen shots of FIGS. 3-7 and 9 below, can be generated by module 16 and/or module 18 of FIG. 1. In FIG. 2, a user may use an interface 200 to define at least one location using the project management system so that the system may perform searches and queries based upon geographic location. The user may enter a name 201 for a location. Exemplary ways the user may define the location include, but are not limited to, providing latitude/longitude values 202, providing a street address 203, providing a county (not shown), providing a postal code 204, and providing a country 205, for example. The user may define the location in any manner of designating location. In certain embodiments, the system geo-codes the provided location information into latitude/longitude values regardless of the type of location information entered by the user.

In one embodiment, the project management system has defined projects, activities, and resources. Each project may be associated with a plurality of activities and a plurality of resources. A project may be a unit of work that can be broken down into one or more tasks. Examples of projects include, but are not limited to, construction projects, engineering design projects, research projects, and government projects. An activity may be a unit of work performed during the process of completing one or more projects. Examples of activities include, but are not limited to, placement of a building foundation for a construction project, completing operational schematics for an engineering design project, gathering lab data for a research project, and presenting plans to government officials for a government project.

FIG. 3 is a screen shot of a list of resources in accordance with one embodiment. Interface 300 displays various resources. Resources may be labor, services, materials, equipment, and anything else that is necessary to complete a project. As shown in interface 300, resources may include "Floor and Carpet Layer" resource 301 and "Judy Billings" resource 302.

In one embodiment, the user assigns the defined locations to the defined projects, activities, and/or resources. The projects, activities, and/or resources may be assigned locations of varying geographic specificity. As an example, the location of a project may be defined as occurring within the state of Pennsylvania. The location of the activities associated with the project may be defined as occurring within the city of Philadelphia, Pa. The locations of resources that may be associated with the activities may be located at specific latitude/longitude coordinates within the city of Philadelphia, Pa. Alternatively, projects, activities, and/or resources may be assigned geographic locations of the same geographic specificity. Certain other embodiments may automatically determine the location of projects, activities, and/or resources (e.g., by using global positioning system (GPS) technology) and automatically assign appropriate locations.

Figure 4:
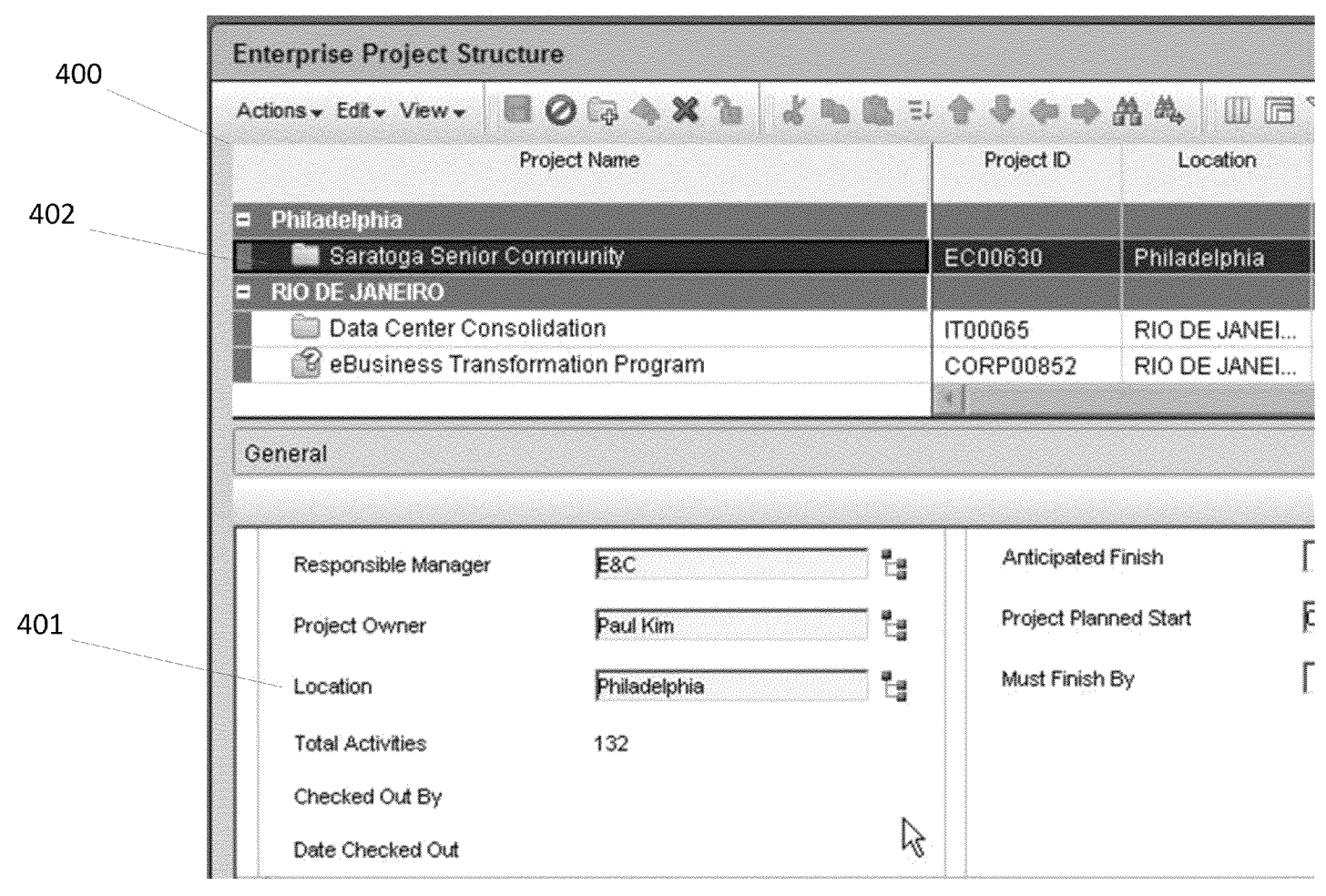

FIG. 4 is a screen shot of a user assigning a location to a project in accordance with one embodiment. For example, in interface 400, a user may assign "Philadelphia" as location 401 for project 402 (i.e., "Saratoga Senior Community").

Figure 5:
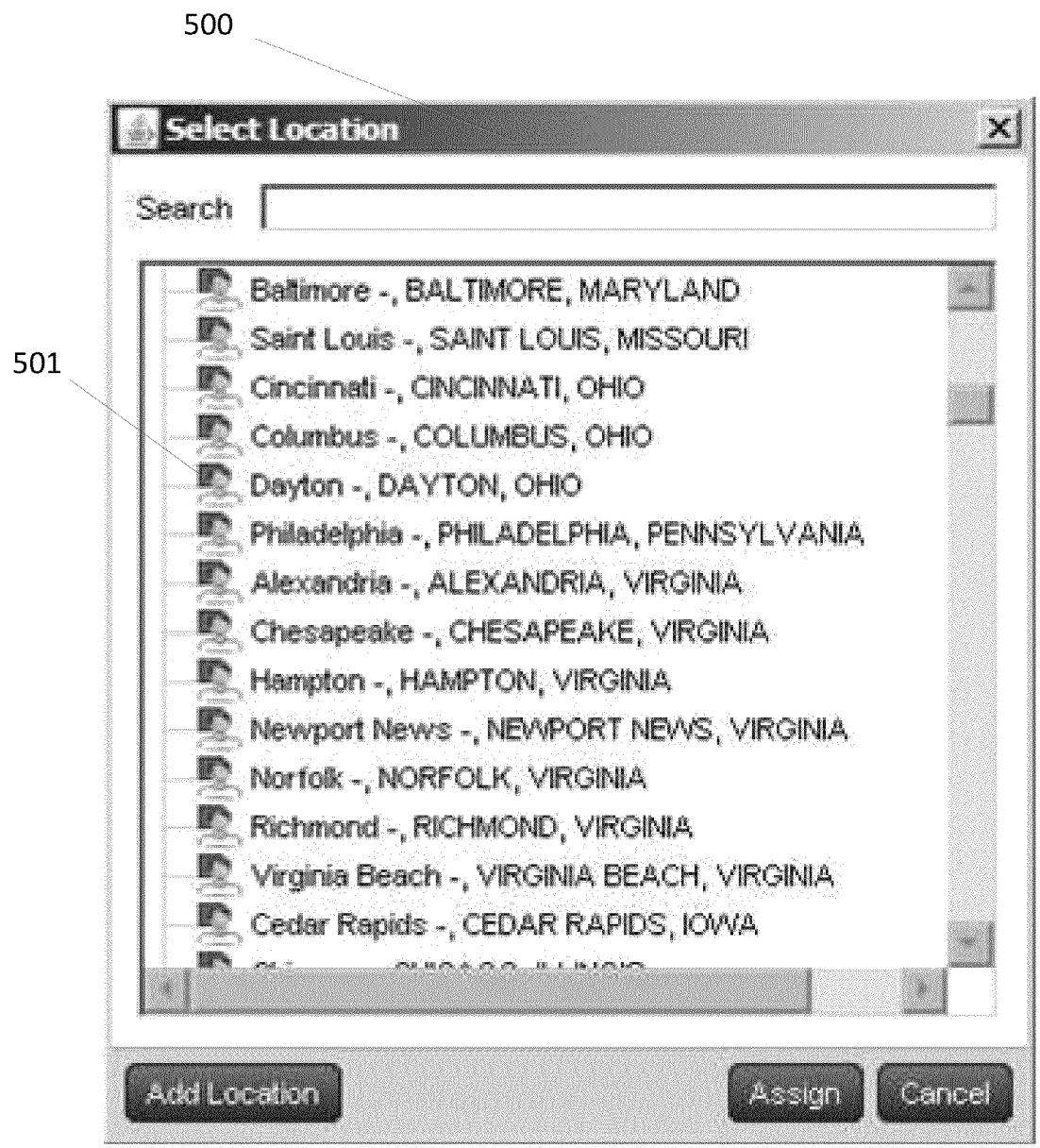
FIG. 5 is a screen shot of a user selecting a location from a list of locations to assign to a project, activity, or resource in accordance with one embodiment.

FIG. 5 is a screen shot of a user selecting a location from a list of locations to assign to a project, activity, or resource in accordance with one embodiment. User interface 500 may provide a list of possible locations 501 that may be selected by the user.

Referring again to FIG. 3, a user may also view the different locations associated with the different resources using interface 300. For example, the resource "Floor and Carpet Layer" 301 is located in Chicago. Resource "Judy Billings" 302 is located in Miami Gardens.

Figure 6:
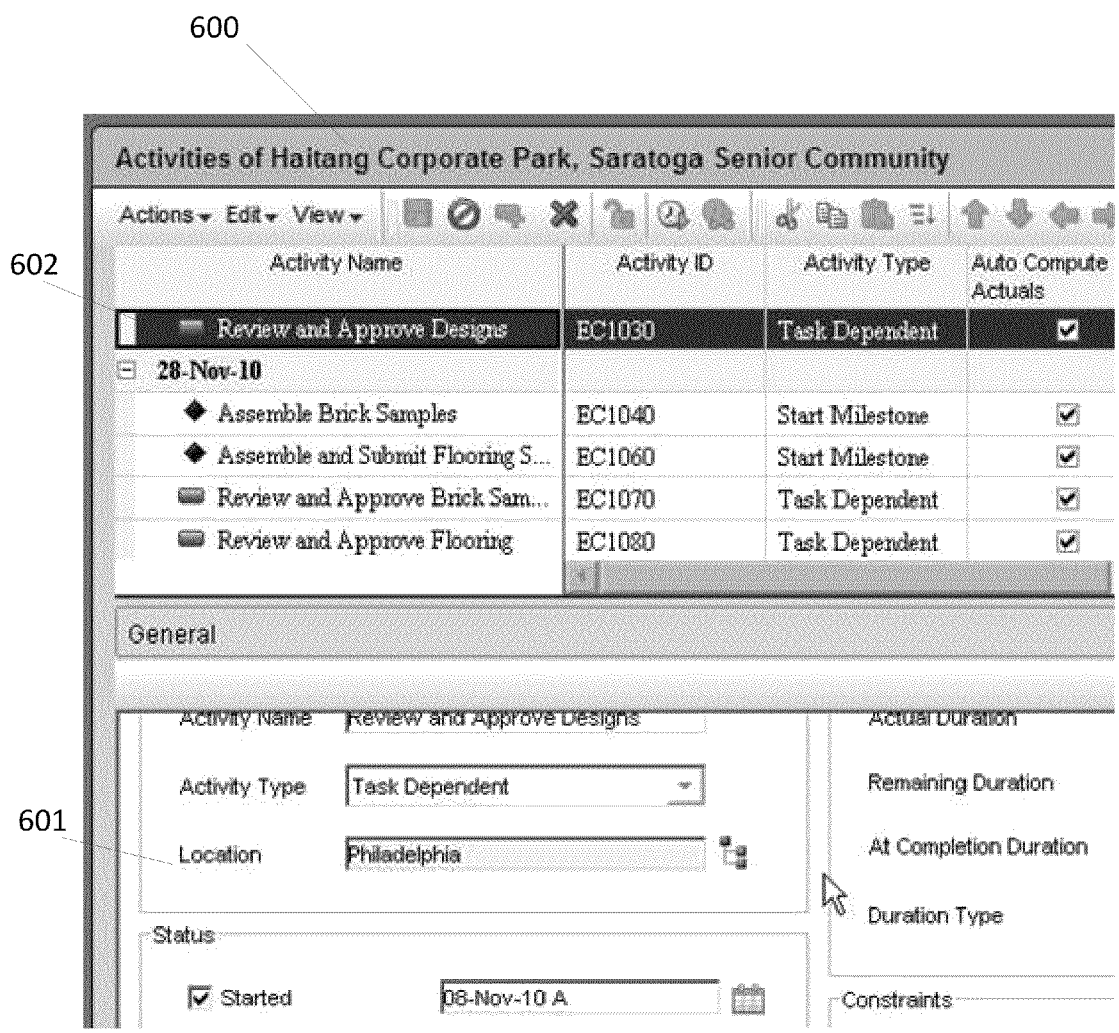
FIG. 6 is a screen shot of a user assigning a location to an activity in accordance with one embodiment.

FIG. 6 is a screen shot of a user assigning a location to an activity in accordance with one embodiment. For example, in user interface 600, a user may assign "Philadelphia" as location 601 for activity 602 (i.e., "Review and Approve Designs").

In one embodiment, after the locations are assigned, the system allows a user to perform viewing, grouping, and filtering of the projects, activities, and resources in a project management system based upon assigned locations. The system also allows a user to perform viewing, grouping, and filtering of the project management data according to whether the data corresponds to projects, activities, or resources. As such, the system may provide users with improved visibility of operations on each of a project-level, activity level, and resource-level. The system may also allow a user to perform viewing, grouping, and filtering of the project management data by location.

Figure 7A:
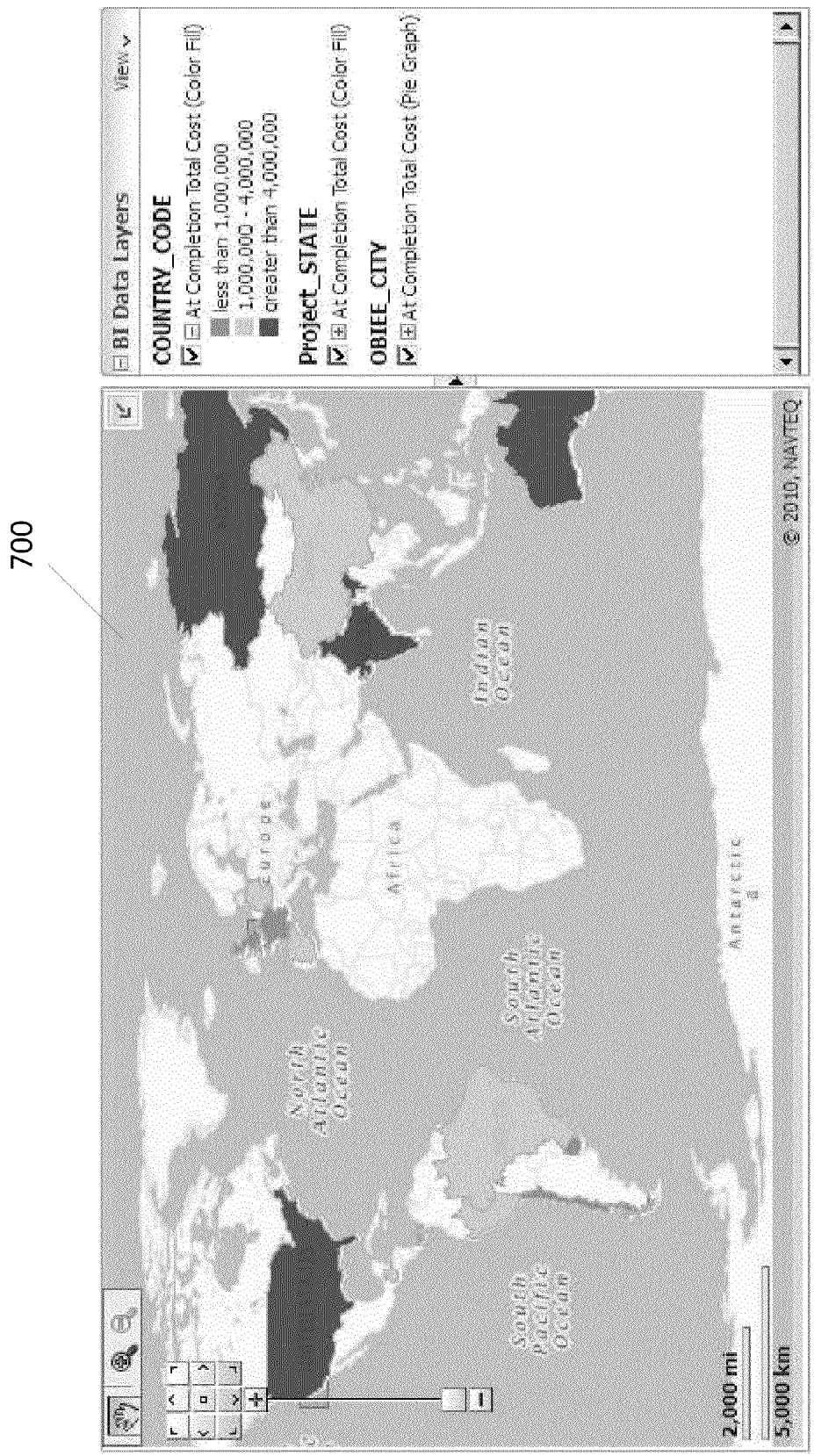
FIG. 7A is a screen shot of an unfiltered view of all project, activity, and resource locations in accordance with one embodiment.

FIG. 7A is a screen shot of an unfiltered view of all project, activity, and resource locations in accordance with one embodiment. As such, in FIG. 7A, a map 700 shows all locations associated with every defined project, activity, and/or resource in a project management system.

Figure 7B:
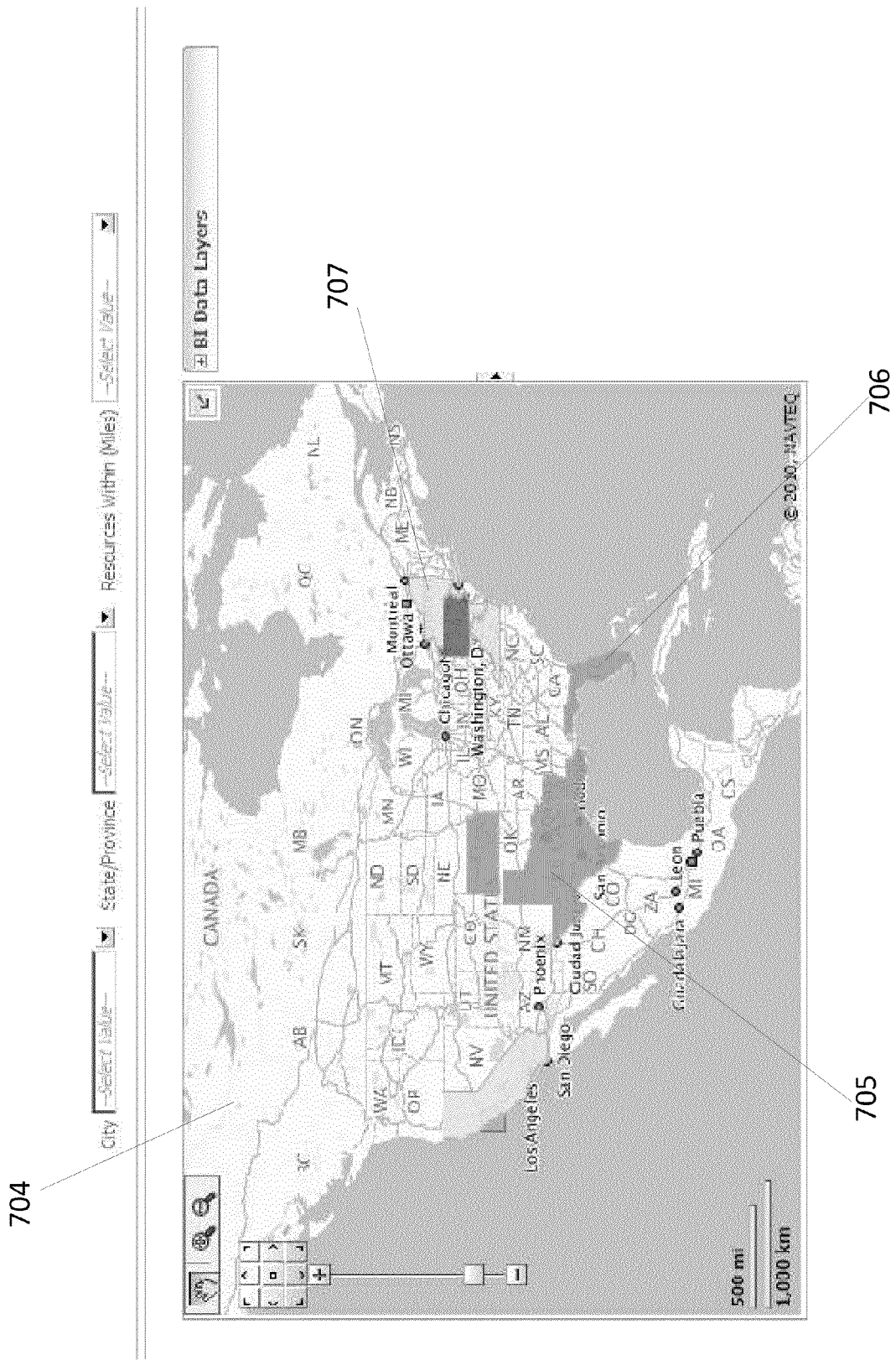
FIG. 7B is a screen shot of a filtered view of all project locations in accordance with one embodiment.

FIG. 7B is a screen shot of a filtered view of all project locations in accordance with one embodiment. In FIG. 7B, a map 704 shows all locations that have associated projects. For example, map 704 shows, as indicated by the shading, that there are projects associated with Texas 705, Florida 706, and New York 707.

Figure 7C:
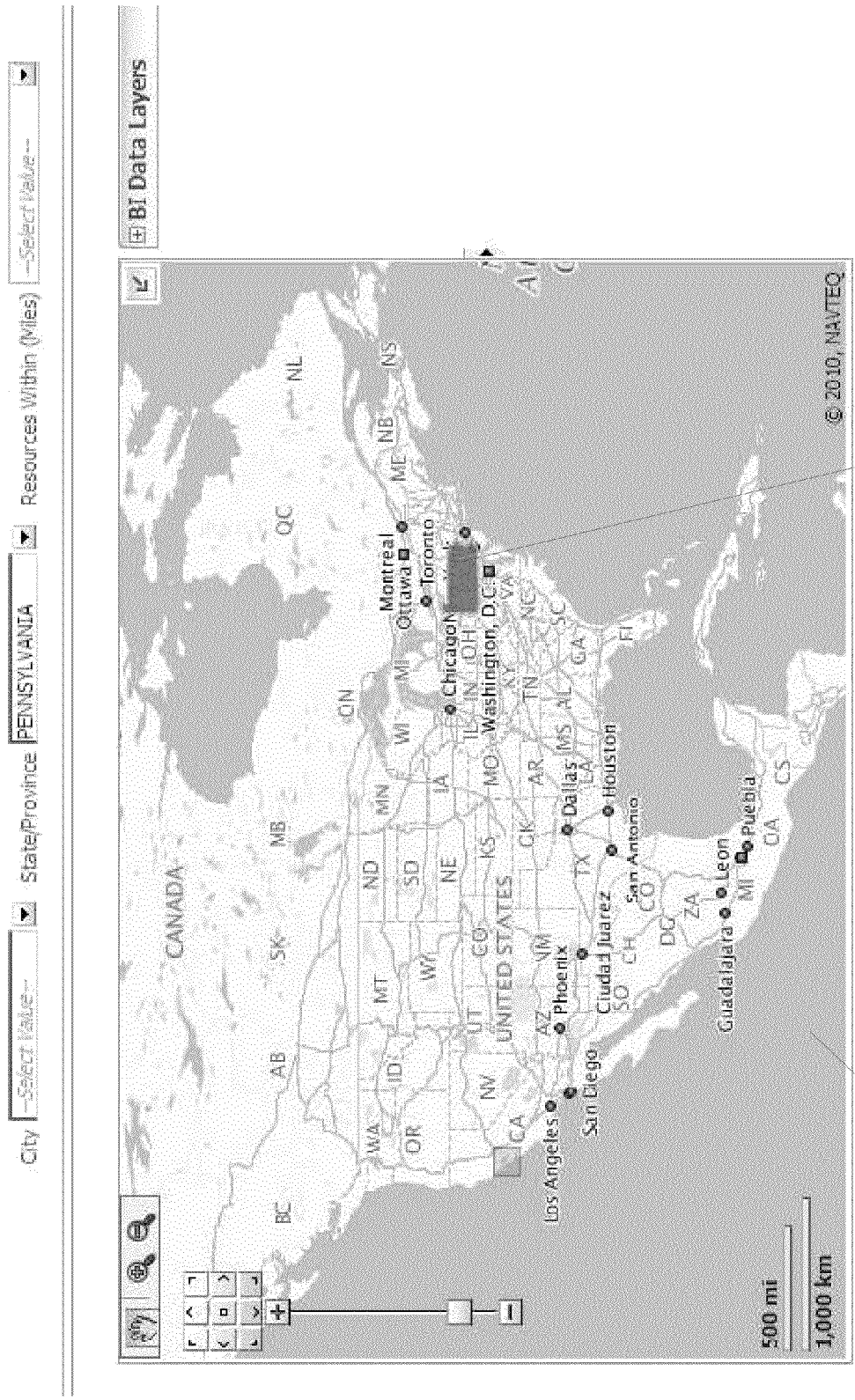
FIG. 7C is a screen shot of a filtered view of all resource locations in accordance with one embodiment.

FIG. 7C is a screen shot of a filtered view of all resource locations in accordance with one embodiment. In FIG. 7C, a map 710 shows all locations that have associated resources. For example, map 710 shows, as indicated by the shading, that there are resources associated with Pennsylvania 711.

FIG. 8 illustrates tables for storing geographic data according to one embodiment. In FIG. 8, the system integrates geographic data with project management data (i.e., data relating to the projects, activities, and/or resources, for example) by adding additional tables 801 to the project management data in a database such as database 17 of FIG. 1. The tables 801 can store street information 802, state information 803, country information 804, and postal code information 805, for example. The tables 801 are combined with project management data in a single database schema.

In one embodiment, after the defined locations are assigned to the defined projects, activities, and/or resources, a user may also perform geographic-based searches on the projects, activities, and/or resources based upon a geographic criteria. In one embodiment, a user may search for projects, activities, and resources within a geographic area or within a specific distance from a predetermined location.

Figure 9:
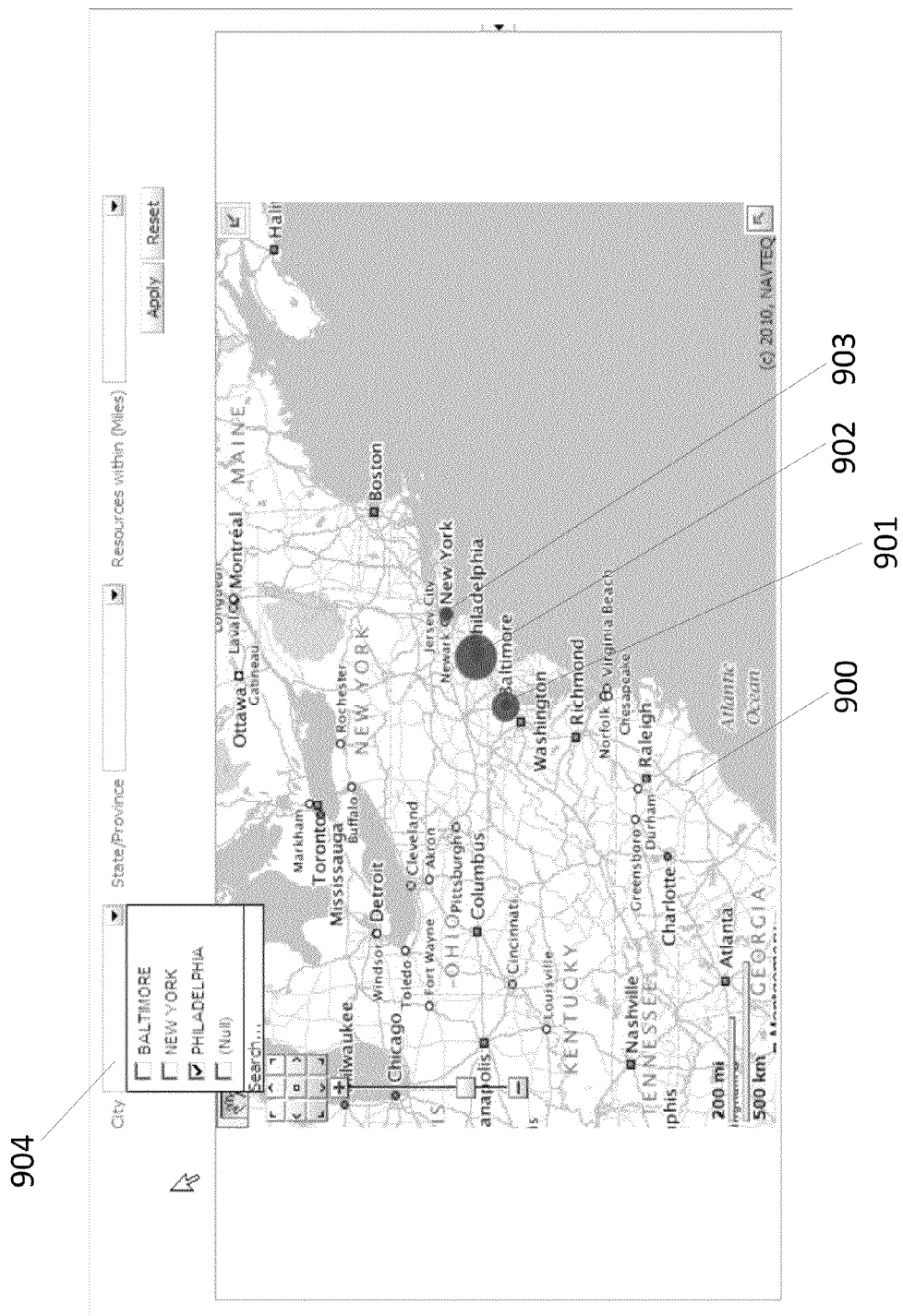
FIG. 9 is a screen shot of a user performing a search for resources with assigned locations that meet a geographic criteria.

FIG. 9 is a screen shot of a user performing a search for resources with assigned locations that meet a geographic criteria. In FIG. 9, map 900 shows a distribution of resources 901, 902, and 903. A user begins to enter a search for resources within a city 904 (i.e., the city of "Philadelphia").

Figure 10:
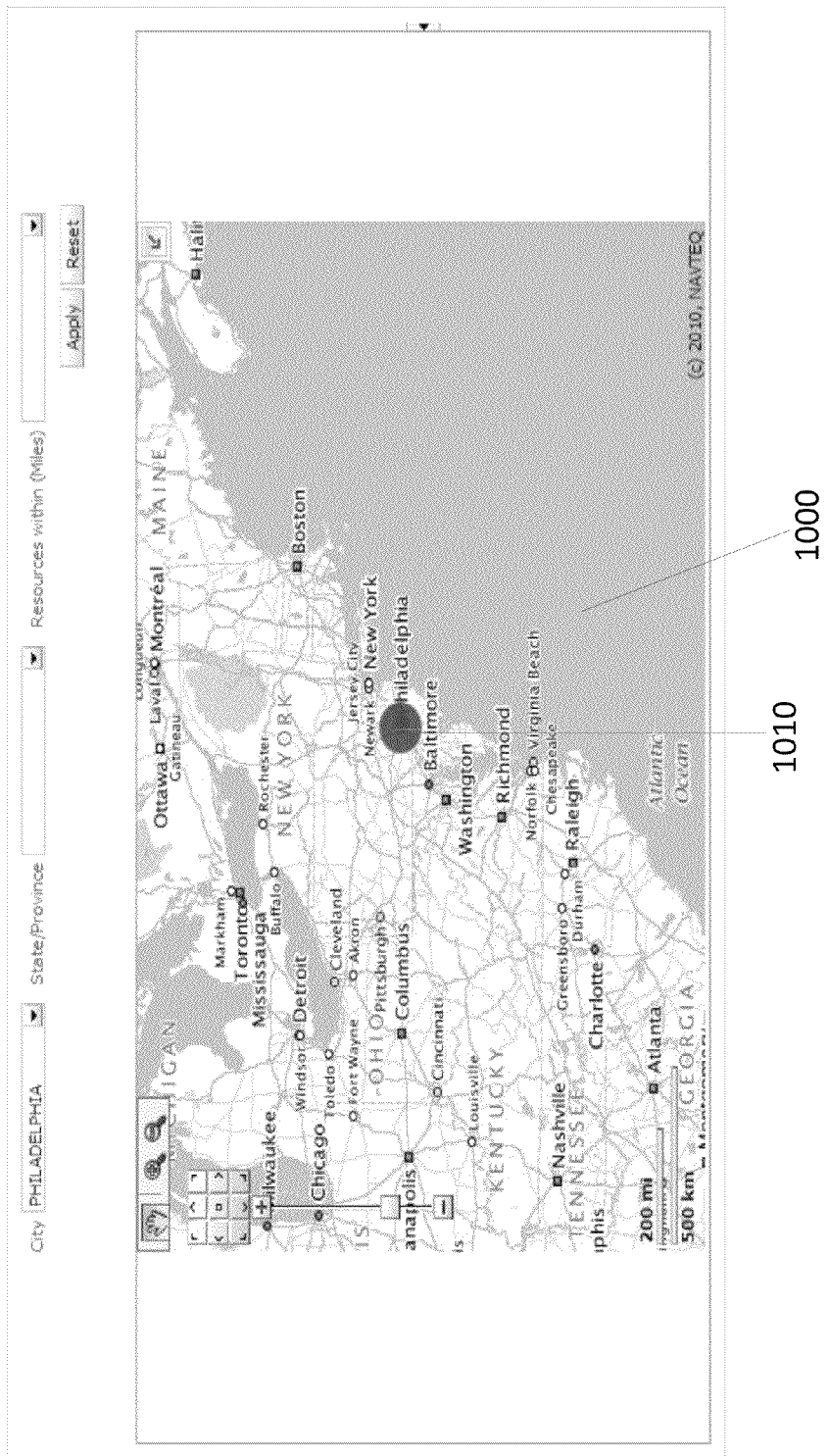
FIG. 10 is a screen shot showing the results of the search performed by the user in FIG. 9.

FIG. 10 is a screen shot showing the results of the search performed by the user in FIG. 9. After the geographic criteria has been applied, map 1000 shows that resources 1010 meet the geographic criteria.

In certain embodiments, if a user is working on a construction project in Philadelphia, a user may find all construction cranes, or any other necessary resources, within a specific number of miles from the construction site, for example. As another example, a County (i.e., the user) may perform a search for available infrastructure in order to determine whether there is sufficient infrastructure to support gas-drilling projects within the County.

Figure 11:
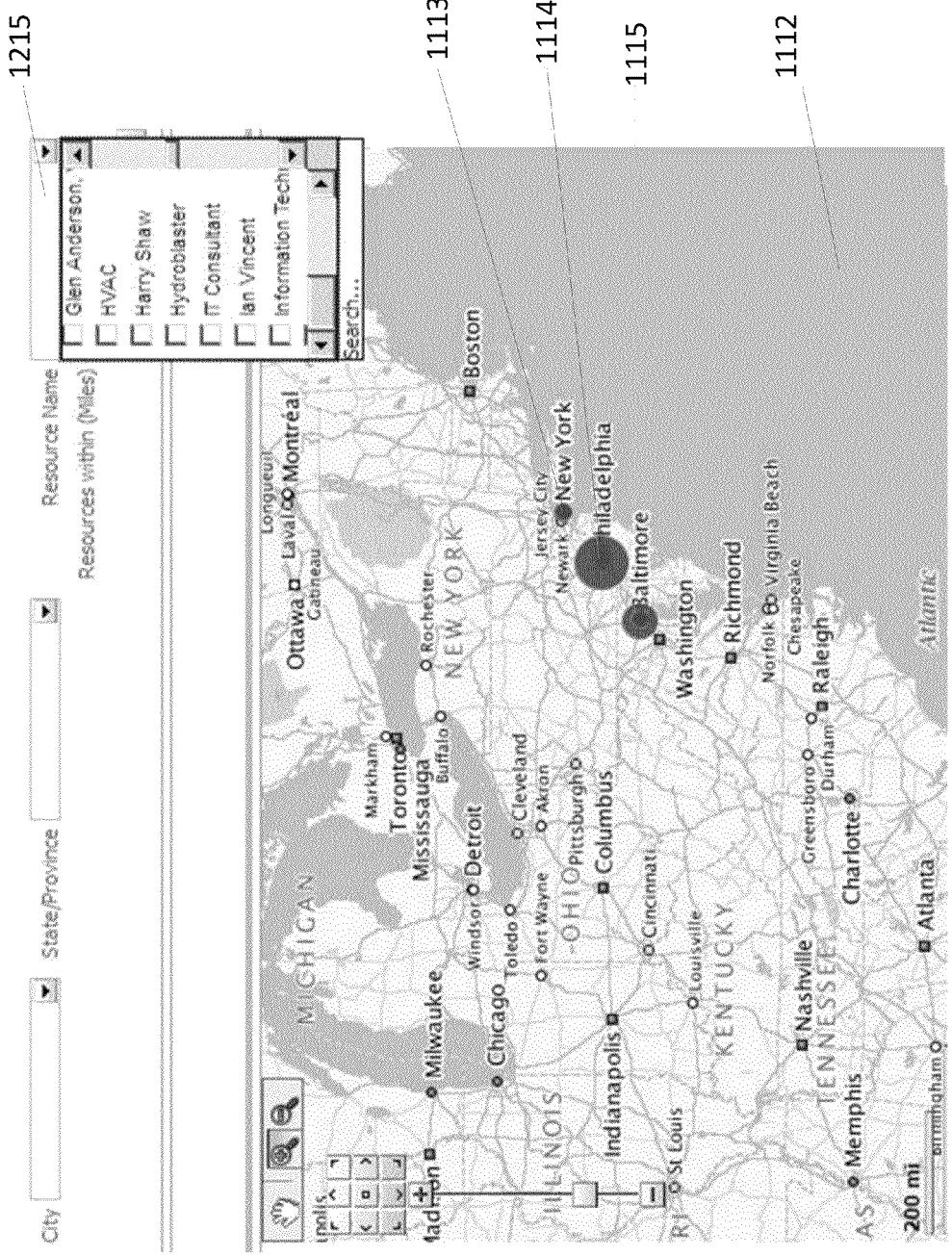
FIG. 11 is a screen shot of a user performing a search for a specific resource in accordance with one embodiment.

FIG. 11 is a screen shot of a user performing a search for a specific resource in accordance with one embodiment. Map 1112 shows a distribution of resources 1113, 1114, and 1115. The user may perform a search for a specific resource (as inputted into field 1215) from a list of possible resources (i.e., "Glen Anderson," "HVAC," "Harry Shaw," "Hydroblaster," "IT Consultant," "Ian Vincent," and "Information Technology," etc.).

Figure 12:
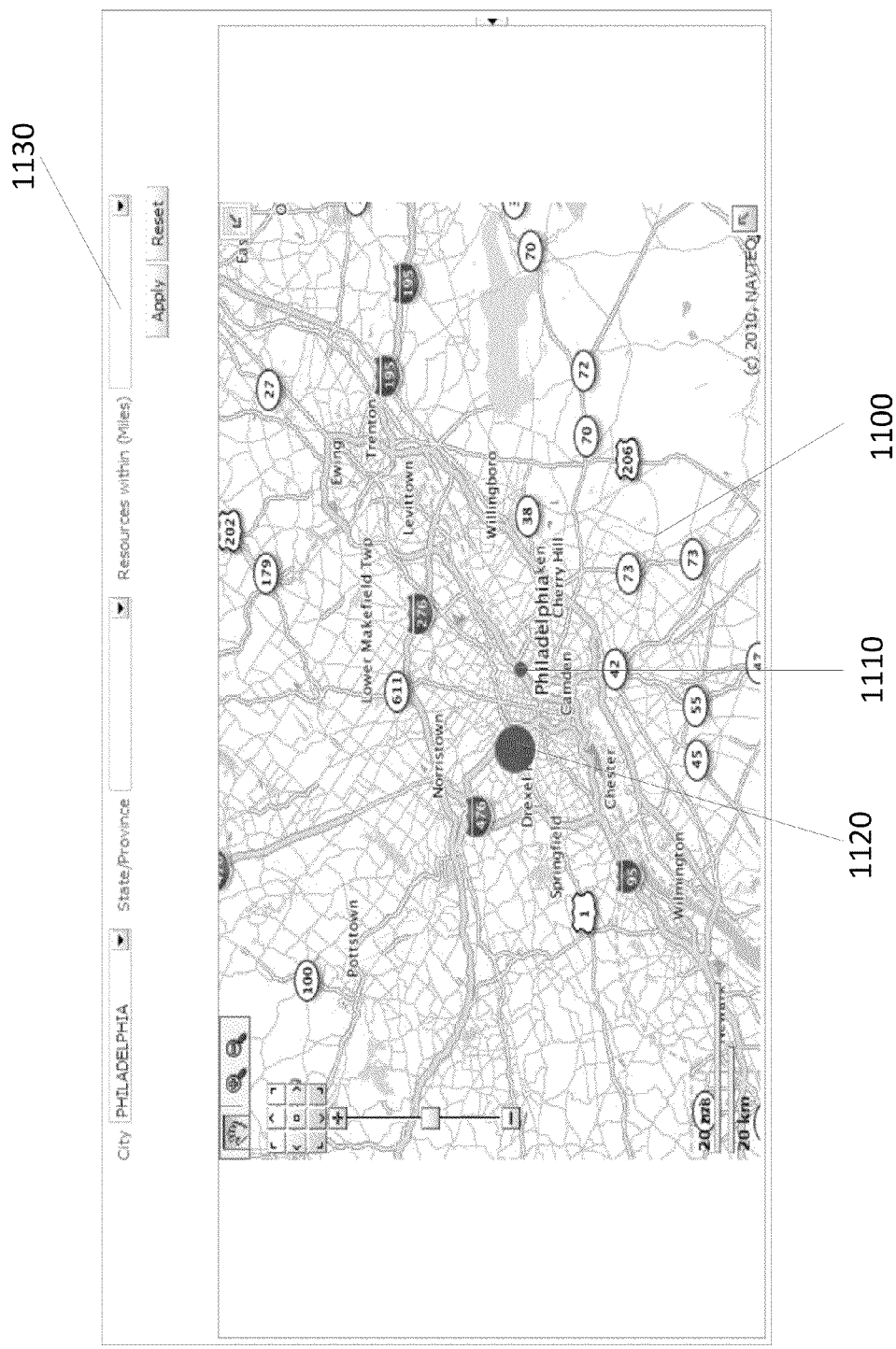
FIG. 12 is a screen shot of resources within a specific city in accordance with one embodiment.

FIG. 12 is a screen shot of resources within a specific city in accordance with one embodiment. Map 1100 shows a distribution of resources 1110 and 1120. The user may perform a search for a resource within a number of miles (as inputted into field 1130) from a predetermined location.

Certain embodiments then return results in response to the user search/query. These embodiments allow users to efficiently locate resources and thus optimize resource allocation within projects. As described above, users may also determine whether sufficient resources exist in a certain area for completing a project.

Figure 13:
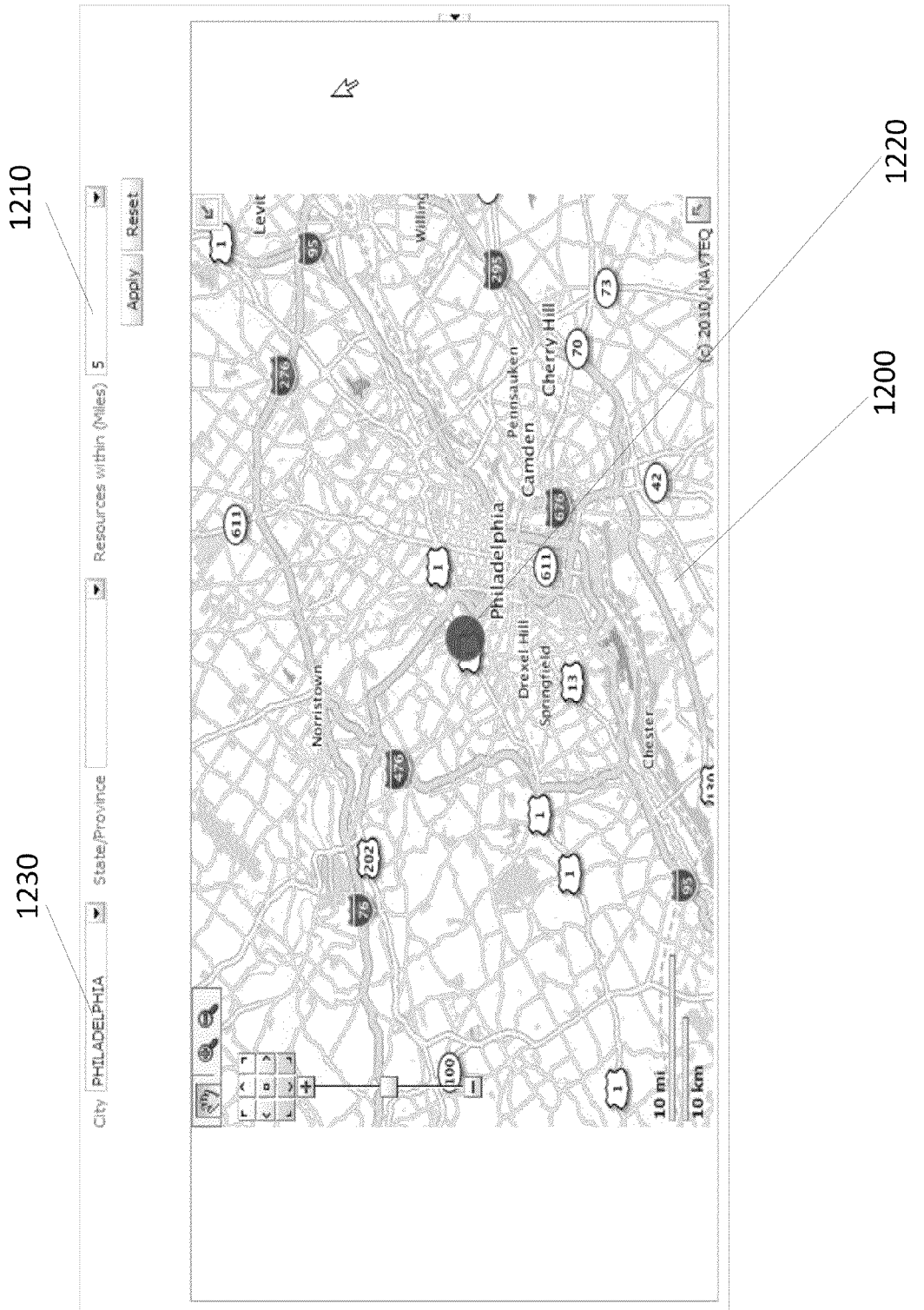
FIG. 13 is a screen shot of a user performing a search for resources within the city of FIG. 12 that meet a geographic criteria.

FIG. 13 is a screen shot of a user performing a search for resources within the city of FIG. 12 that meet a geographic criteria. A user enters "5 miles" within field 1210 in order to search for resources within 5 miles of location 1230 (i.e., the center of Philadelphia), for example. After the geographic criteria has been applied, map 1200 shows that resource 1220 meets the geographic criteria.

Certain embodiments also aid users in the planning and coordinating of projects, activities, and resources in view of difficulties occurring within a defined geographic area. If difficulties arise in a defined geographic area, users may determine which projects, activities, and resources may be affected by these difficulties. For example, a user working on a construction project may be able to determine whether the user's construction site (i.e., a project location) is within a projected path of a natural disaster such as, for example, a hurricane. Certain embodiments integrate geographic information relating to the difficulties with the geographic information of the projects, activities, and resources. In certain embodiments, the difficulties and the geographic location of the difficulties may be defined within the system.

Therefore, certain embodiments allow users to efficiently coordinate their projects, activities, and resources in response to difficulties occurring in defined geographic locations. Users may then be able to avoid or mitigate loss due to these difficulties.

Figure 14:
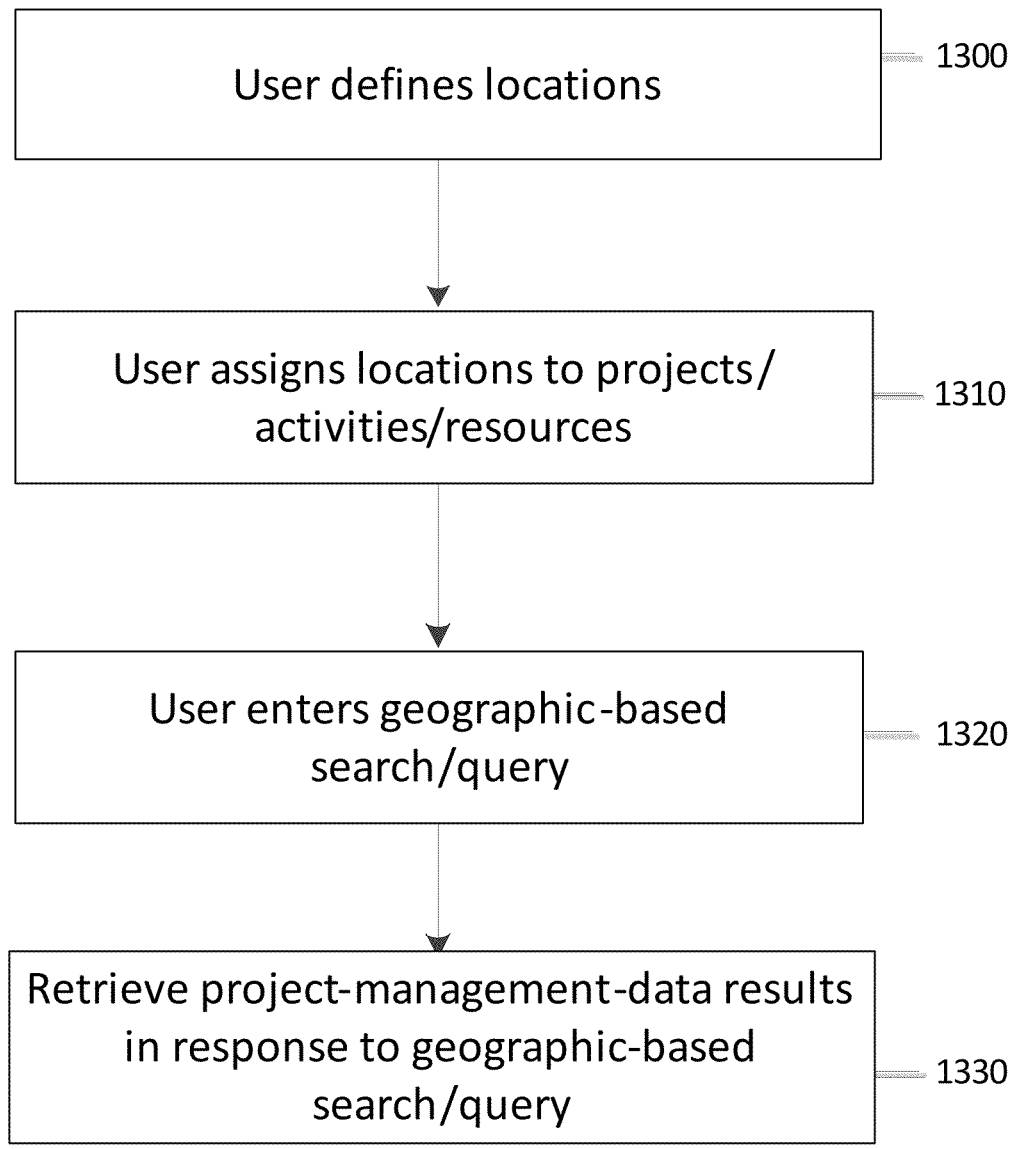
FIG. 14 is a flow diagram of the functionality of the geographic-based search module of FIG. 1 when providing geographic-based search in accordance with one embodiment.

FIG. 14 is a flow diagram of the functionality of the geographic-based search module of FIG. 1 when providing geographic-based search in accordance with one embodiment. In one embodiment, the functionality of the flow diagram of FIG. 14 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1300, a user may define locations. As previously described, a user may define the location in any manner of designating location (e.g., by using interface 200 of FIG. 2).

At 1310, a user may assign the defined locations to projects, activities, and resources (e.g., by using interface 400 of FIG. 4).

At 1320, a user may enter a geographic-based query/search. As previously described, a user may perform geographic-based searches on projects, activities, and resources based upon a geographic criteria (e.g., by entering a predetermined location in 1230 and/or a specific distance in 1210 of FIG. 13).

At 1330, the project management system may retrieve project-management-data results in response to the geographic-based search/query.

As described above, certain embodiments are directed to a project management system that combines project management data and geographic data in a single source. The system may allow users to run complex, location-based searches/queries on project management data and thus efficiently plan, coordinate, and adjust to changing work processes. The system may allow users to efficiently manage operations on a project-level, activity-level, and resource-level. The system may also allow users to track resources geographically and coordinate deployment of the resources.

Because certain embodiments integrate project management data along with geographic/spatial data in a single entity, the user does not need to consolidate data from multiple, separate sources. Project management data and geographic/spatial data is joined together and presented to the user in a seamless manner.

Additionally, because the project management data is integrated with the geographic/spatial data, an integrated security may be used to protect the project management data and the geographic/spatial data. Because the security is integrated, users may be readily protected from unauthorized access to the data.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer readable medium having instructions stored thereon that, when executed by a processor, causes the processor to retrieve project management data based upon geographic criteria, the retrieving comprising:
storing a plurality of geographic location tables in a database, each geographic location table including:
an identification field,
a name field,
at least one of a country field, a state field, a city field, and a street address field and
latitude/longitude data fields;
storing a plurality of project management data tables in the database, each project management data table including:
an identification field,
a starting date field,
an ending date field,
a name field,
a geographic location field identifying one of the geographic location tables, and
one or more activity fields, each activity field identifying an activity table stored in the database, each activity table including:
an identification field,
a starting date field,
an ending date field,
a name field, and
a geographic location field identifying one of the geographic location tables;
storing a plurality of resource tables in the database, each resource table including:
an identification field,
a name field, and
a geographic location field identifying one of the geographic location tables;
determining geographic search criteria based on geographic location table data stored in the database;
presenting the geographic search criteria to a user in a selectable format;
receiving, from the user, a request to retrieve a list of resources that meet a selected geographic criteria, the geographic criteria including at least one of a state, a city, a street address and latitude/longitude data;
searching the plurality of resource tables stored in the database;
retrieving one or more resources that match the selected geographic criteria; and
presenting the matching resources to the user.

2. The computer readable medium of claim 1, wherein the geographical criteria further includes distance from the state, city, street address or latitude/longitude data.

3. The computer readable medium of claim 1, wherein the retrieving project management data further comprises providing a project-level view, an activity-level view, and a resource-level view to the user, each view including geographic location data.

4. The computer readable medium of claim 1, wherein the retrieving project management data further comprises determining whether the geographic locations assigned to the projects, project activities and resources are within a geographical area of a natural disaster.

5. The computer readable medium of claim 1, wherein the plurality of resources include people, materials and equipment.

6. The computer readable medium of claim 1, wherein the retrieving project management data further comprises receiving, from the user, a selection of a resource from the list of resources for allocation to a project or a project activity.

7. The computer readable medium of claim 1, wherein presenting the matching resources to the user includes displaying the matching resources on a map.

8. A method for retrieving project management data based upon geographic criteria, the method comprising:
storing a plurality of geographic location tables in a database, each geographic location including:
an identification field,
a name field,
at least one of a country field, a state field, a city field, and a street address field, and
latitude/longitude data fields;
storing a plurality of project management data tables in the database, each project management data table including:
an identification field,
a starting date field,
an ending date field,
a name field,
a geographic location field identifying one of the geographic location tables, and
one or more activity fields, each activity field identifying an activity table stored in the database, each activity table including:
an identification field,
a starting date field,
an ending date field,
a name field, and
a geographic location field identifying one of the geographic location tables;
storing a plurality of resource tables in the database, each resource table including:
an identification field,
a name field, and
a geographic location field identifying one of the geographic location tables;
determining geographic search criteria based on geographic location table data stored in the database;
presenting the geographic search criteria to a user in a selectable format;
receiving, from the user, a request to retrieve a list of resources that meet a selected geographic criteria, the geographic criteria including at least one of a state, a city, a street address and latitude/longitude data;
searching the plurality of resource tables stored in the database;
retrieving one or more resources that match the selected geographic criteria; and
presenting the matching resources to the user.

9. The method of claim 8, wherein the geographical criteria further includes a distance from the state, city, street address or latitude/longitude data.

10. The method of claim 8, further comprising providing a project-level view, an activity-level view, and a resource-level view to the user, each view including geographic location data.

11. The method of claim 8, further comprising determining whether the geographic locations assigned to the projects, project activities and resources are within a geographical area of a natural disaster.

12. The method of claim 8, wherein the plurality of resources include people, materials and equipment.

13. The method of claim 8, further comprising receiving, from the user, a selection of a resource from the list of resources for allocation to a project or a project activity.

14. The method of claim 8, wherein presenting the matching resources to the user includes displaying the matching resources on a map.

15. A computer system comprising a memory, a display and a processor, coupled to the memory and the display, adapted to retrieve project management data based upon geographic criteria, the retrieving comprising:
- storing a plurality of geographic location tables in a database, each geographic location table including:
  - an identification field,
  - a name field,
  - at least one of a country field, a state field, a city field, and a street address field, and
  - latitude/longitude data fields;
- storing a plurality of project management data tables in the database, each project management data table including:
  - an identification field,
  - a starting date field,
  - an ending date field,
  - a name fields,
  - a geographic location field identifying one of the geographic location tables, and
  - one or more activity fields, each activity field identifying an activity table stored in the database, each activity table including:
    - an identification field,
    - a starting date field,
    - an ending date field,
    - a name field, and
    - a geographic location field identifying one of the geographic location tables,
- storing a plurality of resource tables in the database; each resource including:
  - an identification field,
  - a name field, and
  - a geographic location field identifying one of the geographic location tables;
- determining geographic search criteria based on geographic location table data stored in the database;
- presenting the geographic search criteria to a user in a selectable format;
- receiving, from the user, a request to retrieve a list of resources that meet a selected geographic criteria, the geographic criteria including at least one of a state, a city, a street address and latitude/longitude data;
- searching the plurality of resource tables stored in the database;
- retrieving one or more resources that match the selected geographic criteria; and
- displaying the matching resources to the user on a map.

16. The computer system of claim 15, wherein the geographical criteria includes a distance from the state, city, street address or latitude/longitude data.

17. The computer system of claim 15, wherein the retrieving project management data further comprises providing a project-level view, an activity-level view, and a resource-level view to the user, each view including geographic location data.

18. The computer system of claim 15, wherein the retrieving project management data further comprises determining whether the geographic locations assigned to the projects, project activities and resources are within a geographical area of a natural disaster.

19. The computer system of claim 15, wherein the plurality of resources include people, materials and equipment.

20. The computer system of claim 15, wherein the retrieving project management data further comprises receiving, from the user, a selection of a resource from the list of resources for allocation to a project or a project activity.

\* \* \* \* \*

UNITED STATES PATENT AND TRADEMARK OFFICE
CERTIFICATE OF CORRECTION

| | | |
|---|---|---|
| PATENT NO. | : 9,020,930 B2 | Page 1 of 1 |
| APPLICATION NO. | : 13/560296 | |
| DATED | : April 28, 2015 | |
| INVENTOR(S) | : Lafferty et al. | |

It is certified that error appears in the above-identified patent and that said Letters Patent is hereby corrected as shown below:

In the claims,

In column 7, line 11, in Claim 1, delete "field" and insert -- field, --, therefor.

In column 9, line 20, in Claim 15, delete "fields," and insert -- field, --, therefor.

Signed and Sealed this
Ninth Day of February, 2016

Michelle K. Lee
*Director of the United States Patent and Trademark Office*